United States Patent
Evans et al.

(10) Patent No.: US 12,459,320 B2
(45) Date of Patent: Nov. 4, 2025

(54) VEHICLE SUSPENSION ADAPTOR ASSEMBLIES AND METHODS

(71) Applicant: MORRYDE INTERNATIONAL, INC., Elkhart, IN (US)

(72) Inventors: George Evans, Mishawaka, IN (US); Christopher Taylor, Benton Harbor, MI (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 0 days.

(21) Appl. No.: 18/621,621

(22) Filed: Mar. 29, 2024

(65) Prior Publication Data

US 2024/0336100 A1    Oct. 10, 2024

Related U.S. Application Data

(60) Provisional application No. 63/457,022, filed on Apr. 4, 2023.

(51) Int. Cl.
*B60G 11/107* (2006.01)
*B60G 9/04* (2006.01)
*B60G 11/04* (2006.01)

(52) U.S. Cl.
CPC .............. *B60G 11/107* (2013.01); *B60G 9/04* (2013.01); *B60G 11/04* (2013.01); *B60G 2202/11* (2013.01)

(58) Field of Classification Search
CPC ........ B60G 11/107; B60G 9/04; B60G 11/04; B60G 2202/11; B60G 2300/04; B60G 11/16; B60G 11/28; B60G 2204/4302; B62D 21/15; B62D 21/11; B62D 21/155
See application file for complete search history.

(56) References Cited

U.S. PATENT DOCUMENTS 3,614,122 A * 10/1971 Herren .................... B60C 23/08
                                                       280/682

FOREIGN PATENT DOCUMENTS

WO    WO-2017044463 A1 *  3/2017  ............. B60G 11/28
WO    WO-2021019959 A1 *  2/2021  ............... B60K 1/04

OTHER PUBLICATIONS

Miyazawa, WO-2021019959-A1, Machine Translation of Specification (Year: 2021).*

* cited by examiner

*Primary Examiner* — Drew J Brown
*Assistant Examiner* — Matthew Joseph Ganci
(74) *Attorney, Agent, or Firm* — MARSHALL, GERSTEIN & BORUN LLP

(57) ABSTRACT

A suspension assembly for a vehicle having a first suspension coupled to a frame of the vehicle by a plurality of mounting brackets. The suspension assembly includes an adaptor having a plurality of mounting portions configured to align with and be coupled to the plurality of mounting brackets of the frame. A method for modifying a suspension of a vehicle includes uncoupling a first suspension from mounting brackets secured to a frame of the vehicle, coupling adaptors to the mounting brackets, and coupling a second suspension to the adaptors.

20 Claims, 6 Drawing Sheets

VEHICLE SUSPENSION ADAPTOR ASSEMBLIES AND METHODS

CROSS-REFERENCE TO RELATED APPLICATION

This application claims the priority benefit of U.S. Provisional Application No. 63/457,022, filed Apr. 4, 2023, which is hereby incorporated by reference herein in its entirety.

FIELD OF THE DISCLOSURE

The present disclosure generally relates to suspension assemblies for vehicles.

BACKGROUND

Vehicles can be manufactured with OEM (original equipment manufacturer) suspensions, such as leaf spring suspensions. To modify these vehicles to have a different type of suspension, such as a modular wheel suspension, or raising a height of the vehicle typically involves cutting attachment structure for the OEM suspension off of the vehicle and then welding attachment structure for the new suspension onto the frame of the vehicle. This process can be labor intensive and take multiple days, which can limit the available market for new suspensions.

SUMMARY

In accordance with a first aspect, a suspension assembly for a vehicle having a first suspension coupled to a frame of the vehicle by a plurality of mounting brackets is disclosed. The assembly includes an adaptor having a plurality of mounting portions configured to align with and be coupled to the plurality of mounting brackets of the frame.

In some examples, the plurality of mounting portions include recesses extending downwardly from a top surface of the adaptor, the mounting brackets extending into the recesses when the adaptor is coupled thereto; the adaptor is a beam; the adaptor has a unitary structure or is an assembly of multiple components; the adaptor includes three or more mounting portions; the first suspension is a leaf spring suspension or a torsion axle suspension; the mounting brackets are hanger brackets having a base and opposite sides depending downwardly from the base, the adaptor received at least partially between the opposite sides; and/or the mounting brackets are angle brackets having a downwardly depending flange, the adaptor configured to be coupled to the flange.

In some examples, the assembly further includes a pair of support brackets configured to couple to the adaptor on either side thereof and one or more crush tubes extending between the pair of support brackets within the adaptor. In further examples, the pair of support brackets are configured to couple to the adaptor at one of the mounting portions.

In some examples, the adaptor is a first adaptor and the assembly further includes a second adaptor, the first and second adaptors configured to be coupled to the mounting brackets on opposing sides of the vehicle. In further examples, the assembly includes a modular suspension system, the modular suspension system configured to mount to the first and second adaptors.

In accordance with a second aspect, a method for modifying a suspension of a vehicle is described that includes coupling a suspension to an adaptor having a plurality of mounting portions configured to align with and be coupled to a plurality of mounting brackets of a frame of the vehicle and coupling the adaptor with the suspension coupled thereto to the plurality of mounting brackets of the frame of the vehicle.

In some examples, coupling the suspension to the adaptor includes coupling a modular suspension system to the adaptor.

In accordance with a third aspect, a method for modifying a suspension of a vehicle is disclosed that includes uncoupling a first suspension from mounting brackets secured to a frame of the vehicle, coupling adaptors to the mounting brackets, the adaptors having mounting portions configured to align with the mounting brackets, and coupling a second suspension to the adaptors.

In some examples, uncoupling the first suspension from the mounting brackets includes removing bolts extending through the first suspension and the mounting brackets and coupling the adaptors to the mounting brackets includes installing bolts through the adaptors and the mounting brackets; the first and second suspensions are the same suspension; the first and second suspensions are different suspensions; uncoupling the first suspension from the mounting brackets includes uncoupling a leaf spring suspension from the mounting brackets; coupling the second suspension to the adaptors includes coupling a modular suspension system to the adaptors; and/or coupling the second suspension to the adaptors comprises raising a height of the vehicle.

DETAILED DESCRIPTION

Vehicle suspension adaptor assemblies and methods are described herein that allow a user to easily change a suspension of the vehicle or raise a ride height of the vehicle. The assemblies and methods utilize mounting structure for a previous suspension and an adaptor to provide a mount for a new suspension system, such as a modular suspension system, and/or to raise a ride height for the vehicle with the previous or new suspension.

Any suitable vehicle can be utilized with the disclosure provided herein, including single axle vehicles (e.g., trailers, etc.), two axle vehicles (e.g., cars, trucks, recreational vehicles, trailers, etc.), three axle vehicles, or more. As such, a previous suspension, which can be any type of suspension, can be configured for a single axle or extend across two, three, or more axles.

Figure 1:
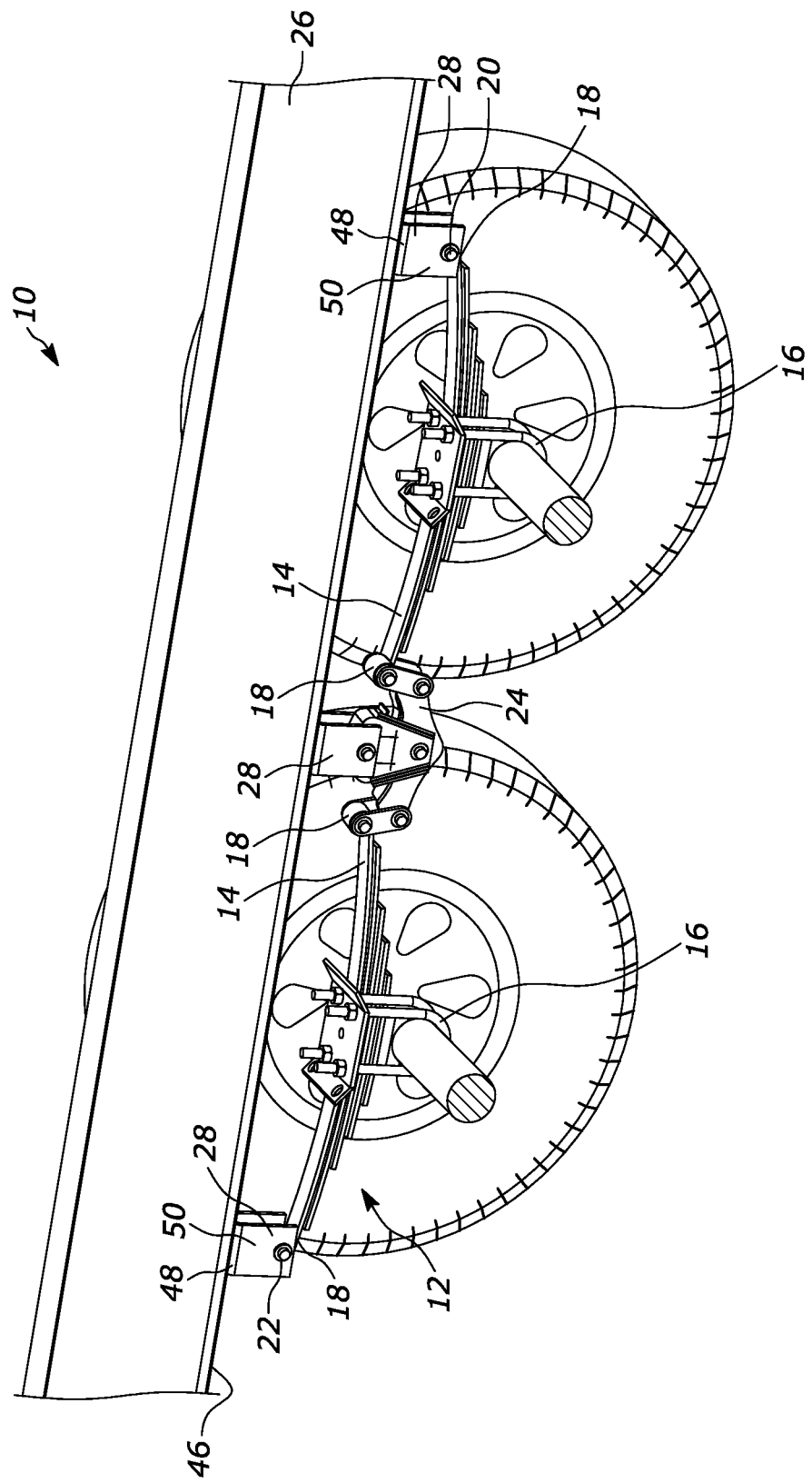
FIG. 1 is a sectional perspective view of a vehicle having a leaf spring suspension.

In one example as shown in FIG. 1, a vehicle 10 may have a leaf spring suspension assembly 12 that includes front and rear leaf springs 14, a U-bolt axle attachment 16, and eyes 18 to pivotably couple the leaf springs 14 to front and rear pivots 20, 22, as well as to an intermediate pivot assembly 24. As shown, the leaf spring suspension assembly 12 mounts to a frame 26 of the vehicle 10 at three spaced hanger or mounting brackets 28, which provide mounting support for the pivots 20, 22 and intermediate pivot assembly 24. It will be appreciated that a single axle vehicle would include one leaf spring with two mounting locations and corresponding mounting brackets 28 and, similarly, that a three or more axle vehicle will include additional leaf springs with corresponding mounting brackets 28. Furthermore, although only one suspension assembly 12 is shown, it will be understood that the vehicle 10 includes a mirrored configuration on an opposite side thereof.

Figure 2:
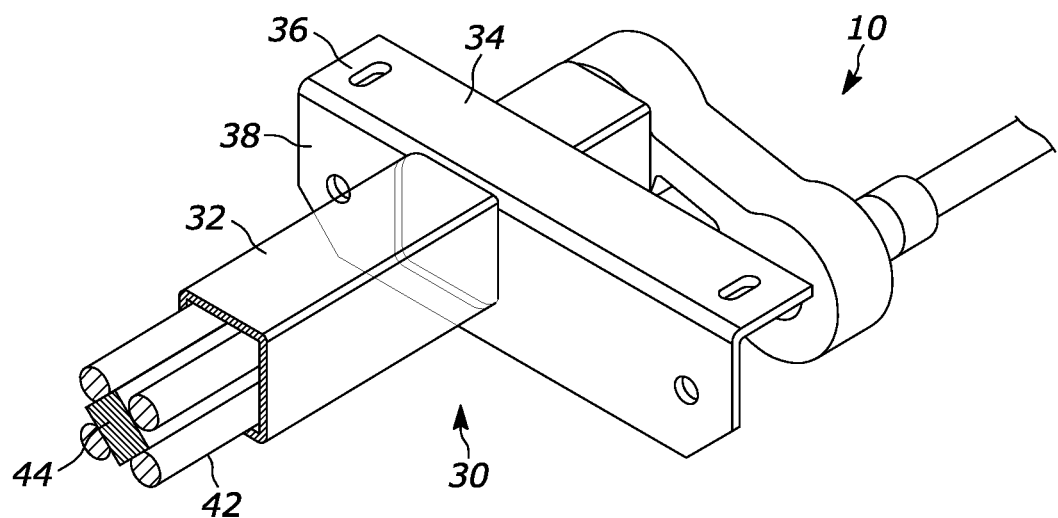
FIG. 2 is a sectional perspective view of a torsion axle suspension.
Figure 3:
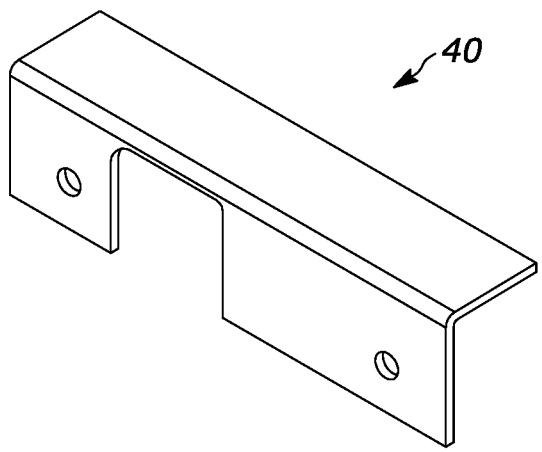
FIG. 3 is a perspective view of an optional angle bracket for the torsion axle suspension of FIG. 2.

In another example as shown in FIGS. 2 and 3, the vehicle 10 may have a torsion axle suspension 30 that includes an outer tubular housing 32 secured to the frame 26 via a mounting bracket 34. The mounting bracket 34 of this form can be an angle bracket having a top flange 36 and a downwardly depending side flange 38. The flange 38 can be part of or secured to the axle and welded to the housing 32. Another angle bracket 40 can be welded to the frame 26 to extend along the mounting bracket 34 and be secured to the mounting bracket 34, such as with fasteners through the shown openings in the side flange 38. Alternatively, the mounting bracket 34 can be directly secured to the frame 26, such as with fasteners through the shown openings in the top flange 36, or indirectly via a bracket secured to the frame 26 under the top flange 36. As commonly understood, the torsion axle suspension 30 provides cushioning by compressing/displacing rubber or other compressible cords 42 disposed in the housing 32 and rotating a beam 44 coupled to the wheel between the cords 42. The housing 32 and beam 44 have square/rectangular cross-sections, such that the cords 42 are held in place and compress when the beam 44 is rotated.

Figure 4:
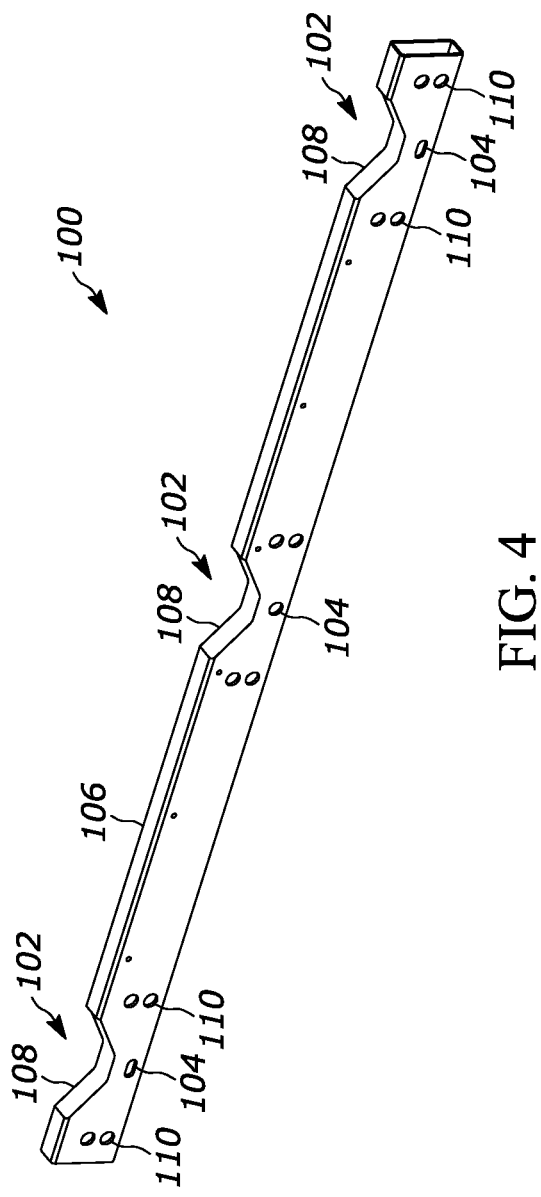
FIG. 4 is a perspective view of a suspension adaptor.
Figure 5:
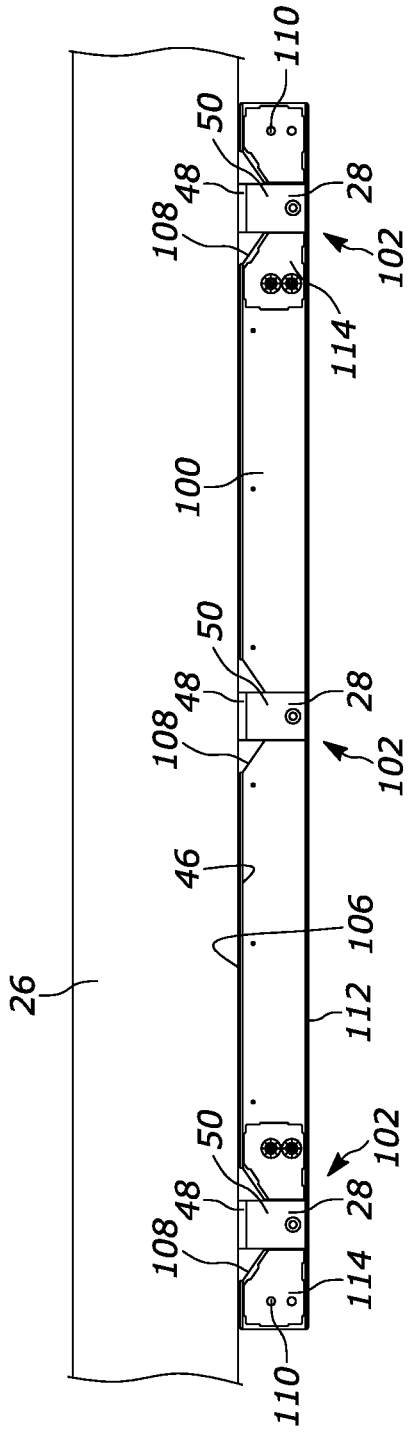
FIG. 5 is a sectional side elevational view of the suspension adaptor of FIG. 4 mounted to a frame of a vehicle.

One example suspension adaptor 100 is shown in FIGS. 4 and 5. The adaptor 100 is a beam or assembly configured to mount to the frame 26 of the vehicle 10 utilizing the mounting structure of a previous suspension, such as the leaf spring suspension assembly 12 or other suspension. Although one adaptor 100 is shown, it will be understood that two adaptors 100 can be utilized when changing the suspension of the vehicle 10, one for each side thereof.

The adaptor 100 includes mounting portions 102 configured to align with and couple to the mounting brackets 28 extending downwardly from the frame 26 of the vehicle 10. As shown, the mounting portions 102 are sized and configured to engage the mounting brackets 28. In the illustrated form, the mounting portion 102 include openings 104 to receive bolts or other fasteners therethrough to secure the adaptor 100 to the mounting brackets 28 extending from the frame 26. In another example, the adaptor 100 may be wider than the mounting brackets 28 and include openings in a top surface 106 thereof aligned with the mounting brackets 28, such that the mounting brackets 28 extend into the adaptor 100. The openings can be a single opening or two openings to receive sides of the mounting brackets 28 therein.

In some examples, the top surface 106 of the adaptor 100 can sit flush along a bottom surface 46 of the frame 26. To accommodate for a depth of the mounting brackets 28, the mounting portions 102 can each include a recess 108 extending downwardly from the top surface 106, such that a base 48 of the mounting brackets 28 does not abut the adaptor 100, but rather extends into the respective recess 108 when the adaptor 100 is coupled thereto. The recesses 108 can have a suitable configuration, such as trapezoidal as shown, curved, etc. In other examples, the adaptor 100 can be spaced from the frame 26 by a gap or small distance depending on the configurations of the mounting brackets 28 and mounting portions 102.

As shown in FIG. 4, the adaptor 100 may further include cross-beam openings 110 to receive fasteners therethrough to mount cross-beams 206 (FIG. 6) to the adaptor 100. For example, the cross-beam openings 110 can be disposed on either side of the front and rear mounting portions 102. The cross-beam openings 110 can be positioned in any suitable configuration for a particular suspension setup. In the illustrated form, the cross-beam openings 110 include stacked openings on either side of the mounting portions 102, but additional, or fewer, openings could be utilized. Further, mounting openings can be provided on other portions of the adaptor 100, such as around the middle mounting portion 102 and/or in between the mounting portions 102.

The adaptor 100 can have any suitable form. In the illustrated example, the adaptor 100 is a beam having a rectangular vertical cross-section. The beam can have a depth sized to fit within the mounting brackets 28. For example, the mounting brackets 28 can have a U-shaped configuration and the beam can fit between opposing sides 50 of the mounting brackets 28. Alternatively, the beam can be wider than the brackets 28 as discussed above. The beam can be hollow, as shown, or can have a solid cross-section. The adaptor 100 can be a unitary component or an assembly of components coupled together by any suitable methods, including fasteners, welding, etc.

Figure 6:
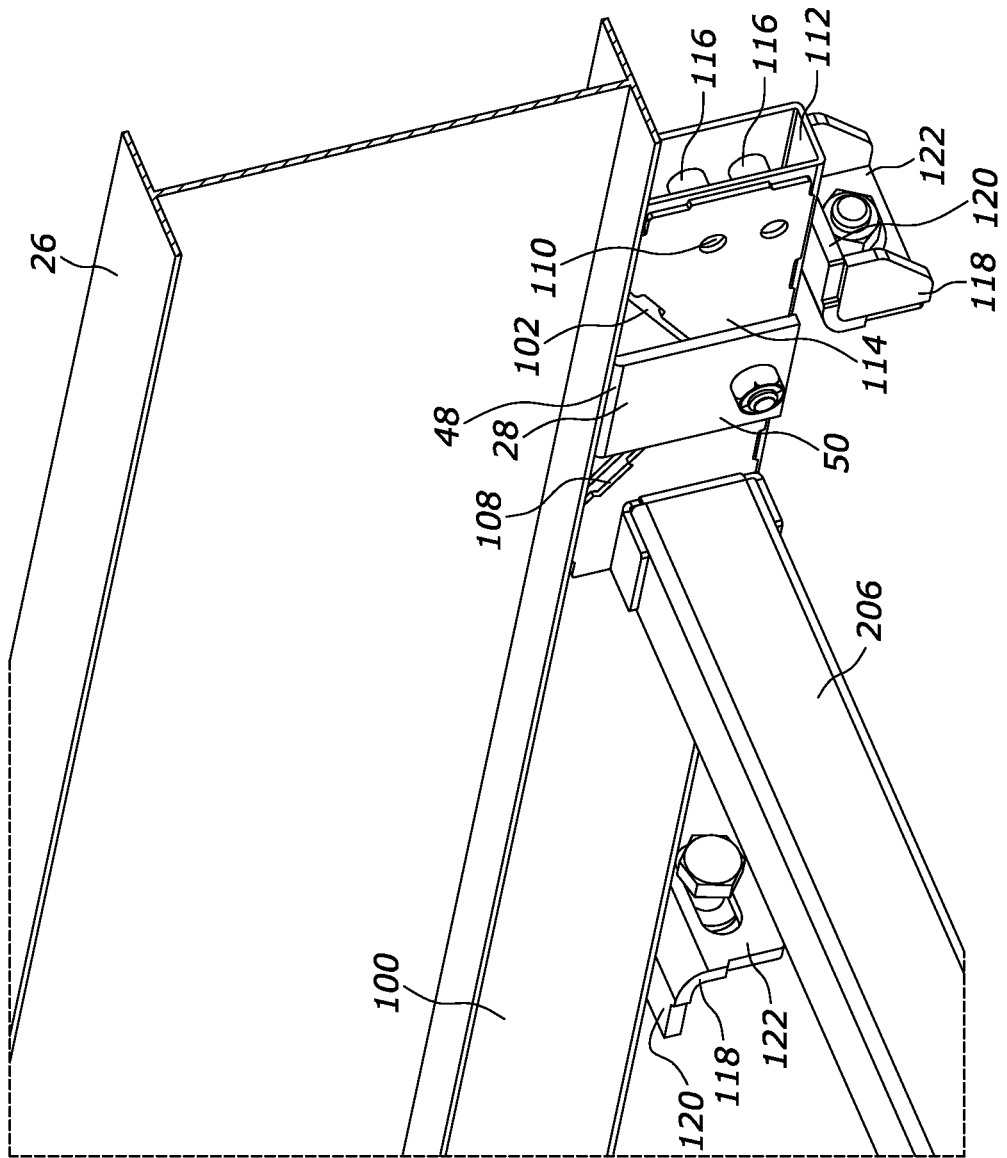
FIG. 6 is a sectional perspective view of the suspension adaptor of FIG. 4 mounted to a frame of a vehicle.
Figure 7:
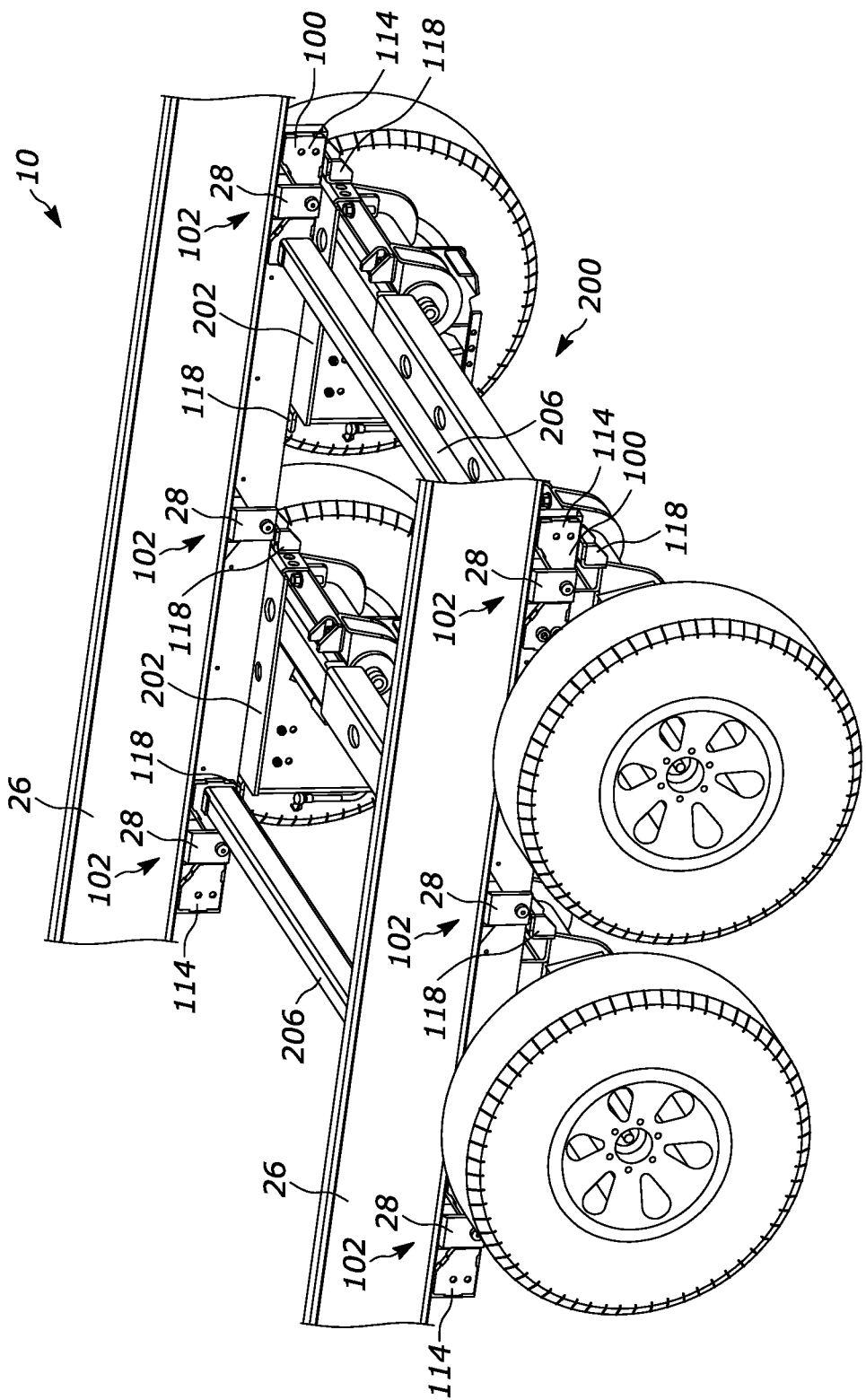
FIG. 7 is a perspective view of a portion of a vehicle having the suspension adaptor of FIG. 4 mounted to a frame thereof and a modular suspension system mounted to the suspension adaptor.

In some cases, as best shown in FIG. 6, additional support plates 114 can be secured to the adaptor 100, such as by welding or fasteners. The support plates 114 have a planar configuration as shown. The support plates 114 can be sized to fit between the sides 50 of the mounting brackets 28 along with the adaptor 100 or can be disposed outwardly thereof as described herein. The support plates 114 can be secured to the adaptor 100 after crush tubes 116 are disposed within the adaptor 100 to extend between the cross-beam openings 110. The support plates 114 effectively hold the crush tubes 116 in place extending transversely within the adaptor 100, which reduces or prevents any crush damage to the adaptor 100 when securing fasteners within the cross-beam openings 110 and during operation of the vehicle 10 due to forces from the cross-beams 206, as shown in FIGS. 6 and 7. Further, the support plates 114 can have a complementary configuration to the mounting portions 102, generally matching the profile of the recesses 108 thereof.

As shown in FIG. 6, the adaptor 100 may further include corner brackets 118 coupled to a bottom surface 112 thereof. Adjacent pairs of corner brackets 118 can face one another to receive mounting structure of a suspension therebetween, as shown in FIG. 7. Each corner bracket 118 may have a horizontal, top portion 120 and a vertical, bottom portion 122. The corner brackets 118 can be coupled to the adaptor 100 by any suitable method, including welding and/or fasteners (e.g., bolts, rivets, etc.).

An example suspension assembly 200 utilizing two adaptors 100 is shown in FIG. 7. The assembly 200 includes a modular wheel suspension having plates and other brackets to secure components of the modular wheel suspension to the adaptors 100, which are secured to both sides of the frame 26/vehicle 10. For example, the assembly 200 can include a housing 202 secured to the adaptor 100 between adjacent pairs of corner brackets 118. As shown, the assembly 200 can further include cross-beams 206 extending between the adaptors 100 and, in some forms, the support plates 114.

One suitable modular wheel suspension is disclosed in U.S. Pat. No. 5,899,470, issued May 4, 1999, which is incorporated by reference herein in its entirety.

Figure 8:
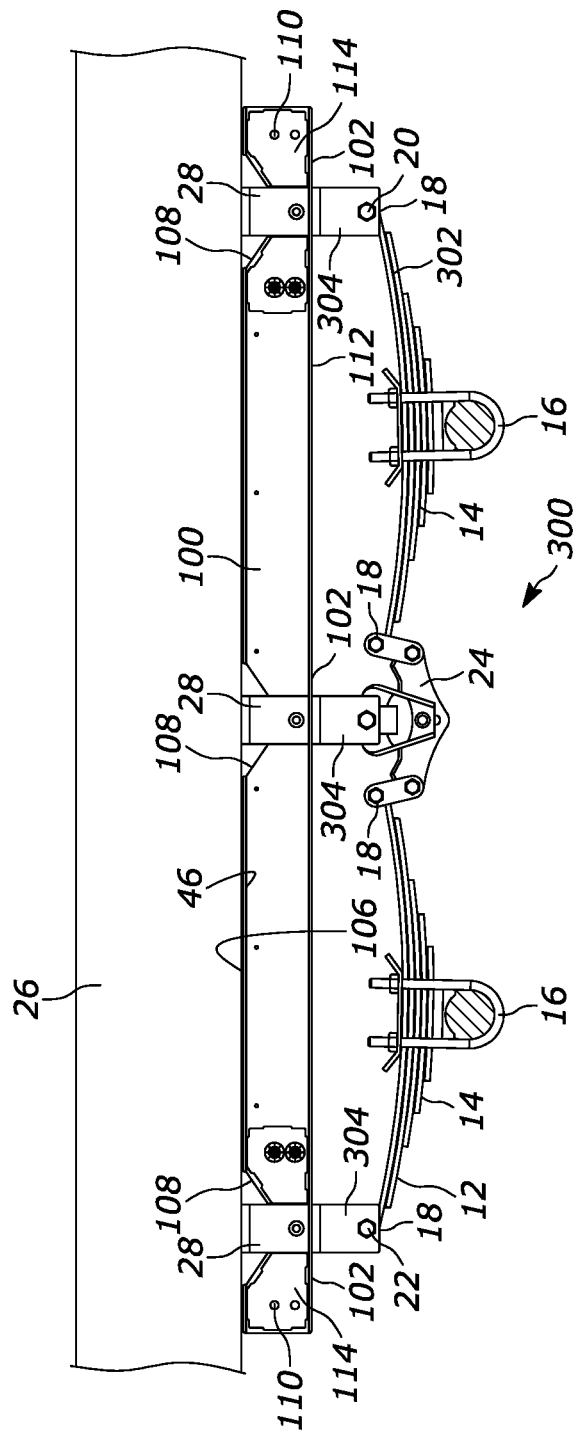
FIG. 8 is a side elevational view of the suspension adaptor of FIG. 4 mounted to a frame of a vehicle and having a leaf spring suspension assembly mounted thereto.

Another example suspension assembly 300 utilizing the adaptors 100 is shown in FIG. 8. The assembly 300 of this example uses the adaptor 100 to raise the vehicle 10 by providing a relatively lower mounting surface for a subsequent suspension 302. The suspension 302 can be the same, previously-removed suspension or can be a new suspension that raises the height of the vehicle. For example, as shown in FIG. 8, the suspension 302 can be a leaf spring suspension and additional hanging brackets 304 can be coupled to the adaptor 100 by any suitable method, including welding and fasteners. The suspension assembly 300 of this form may further include cross-beams mounted and configured similarly to that shown and described with respect to FIG. 7. It will be understood that the torsion axle suspension 30, or other suspensions, can be reutilized in a similar manner.

In accordance with the above, a method for modifying a suspension of a vehicle (e.g., vehicle 10) is provided. In some examples, the method can be directed to providing a pre-assembled adaptor and suspension for a user to mount to a suitable vehicle (e.g., vehicle 10). The method includes coupling a suspension (e.g., the leaf spring suspension 12, the modular suspension assembly 200, or other suspension) to an adaptor (e.g., adaptor 100) having a plurality of mounting portions (e.g., mounting portions 108) configured to align with and be coupled to a plurality of mounting brackets (e.g., brackets 28) secured to a frame (e.g., frame 26) of the vehicle and coupling the adaptor with the suspension coupled thereto to the plurality of mounting brackets of the frame of the vehicle.

In some examples, coupling the suspension to the adaptor comprises coupling a modular suspension system to the adaptor. In additional examples, the method can include providing a plurality of pre-assembled adaptors and suspensions.

In accordance with the above, a method for modifying a suspension of a vehicle (e.g., vehicle 10) is provided. In some examples, the method can be directed to changing a suspension of the vehicle and/or raising a height of the vehicle. The method includes uncoupling a first suspension (e.g., the leaf spring suspension 12, the modular suspension assembly 200, or other suspension) from mounting brackets (e.g., brackets 28) secured to a frame (e.g., frame 26) of the vehicle, coupling adaptors (e.g., adaptors 100) to the mounting brackets, the adaptors having mounting portions (e.g., mounting portions 108) configured to align with the mounting brackets, and coupling a second suspension (e.g., the leaf spring suspension 12, the modular suspension assembly 200, or other suspension) to the adaptors.

Uncoupling the first suspension from the mounting brackets can include removing bolts or other fasteners extending through the first suspension and the mounting brackets and coupling the adaptors to the mounting brackets can include installing bolts or other fasteners through the adaptors and the mounting brackets.

In some examples, the first and second suspensions can be the same suspension. In other examples, the first and second suspensions can be different suspensions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A suspension assembly for a vehicle having a frame comprising downwardly extending beams and a plurality of mounting brackets secured to the downwardly extending beams configured to have a first suspension coupled thereto, the assembly comprising:
   an adaptor having a body configured to be disposed below one of the downwardly extending beams of the frame such that a top surface extends along the one of the downwardly extending beams of the frame, the body including a plurality of mounting portions configured to align with and be coupled to the plurality of mounting brackets to couple the adaptor to the downwardly extending beams of the frame via the mounting brackets, the adaptor configured to have at least a portion of a suspension coupled thereto.

2. The assembly of claim 1, wherein the plurality of mounting portions include recesses extending downwardly from the top surface of the adaptor, the top surface of the adaptor abutting the one of the downwardly extending beams and the mounting brackets extending into the recesses when the adaptor is coupled thereto.

3. The assembly of claim 1, wherein the adaptor comprises an assembly of multiple components.

4. The assembly of claim 1, wherein the adaptor comprises three or more mounting portions.

5. The assembly of claim 1, further comprising:
a pair of support brackets configured to couple to the adaptor on either side thereof; and
one or more crush tubes extending between the pair of support brackets within the adaptor.

6. The assembly of claim 5, wherein the pair of support brackets are configured to couple to the adaptor at one of the mounting portions.

7. The assembly of claim 1, wherein the adaptor comprises a first adaptor; and further comprising a second adaptor, the first and second adaptors configured to be coupled to the mounting brackets coupled to the downwardly extending beams on opposing sides of the vehicle.

8. The assembly of claim 7, further comprising a modular suspension system, the modular suspension system configured to mount to the first and second adaptors.

9. The assembly of claim 7, wherein the first suspension is a leaf spring suspension or a torsion axle suspension configured to mount to the first and second adaptors.

10. The assembly of claim 1, wherein the mounting brackets comprise hanger brackets having a base configured to extend along one of the downwardly extending beams and opposite sides depending downwardly from the base, the adaptor received at least partially between the opposite sides.

11. The assembly of claim 1, wherein the mounting brackets comprise angle brackets having a downwardly depending flange, the adaptor configured to be coupled to the flange.

12. A method for modifying a suspension of a vehicle, the method comprising:
coupling a suspension to an adaptor having a body with a plurality of mounting portions; and
coupling the adaptor with the suspension coupled thereto to a plurality of mounting brackets coupled to a downwardly extending beam of a frame of the vehicle such that the body of the adaptor is disposed below the downwardly extending beam and a top surface of the adaptor extends along the downwardly extending beam.

13. The method of claim 12, wherein coupling the suspension to the adaptor comprises coupling a modular suspension system to the adaptor.

14. A method for modifying a suspension of a vehicle, the method comprising:
uncoupling a first suspension from mounting brackets secured to downwardly extending beams of a frame of the vehicle;
coupling adaptors to the mounting brackets, such that bodies of the adaptors are disposed below the downwardly extending beams of the frame and top surfaces of the bodies extend along the downwardly extending beams, the bodies of the adaptors having mounting portions configured to align with the mounting brackets; and
coupling a second suspension to the adaptors.

15. The method of claim 14, wherein uncoupling the first suspension from the mounting brackets comprises removing bolts extending through the first suspension and the mounting brackets; and coupling the adaptors to the mounting brackets comprises installing bolts through the adaptors and the mounting brackets.

16. The method of claim 14, wherein the first and second suspensions are the same suspension.

17. The method of claim 14, wherein the first and second suspensions are different suspensions.

18. The method of claim 14, wherein uncoupling the first suspension from the mounting brackets comprises uncoupling a leaf spring suspension from the mounting brackets.

19. The method of claim 14, wherein coupling the second suspension to the adaptors comprises coupling a modular suspension system to the adaptors.

20. The method of claim 14, wherein coupling the second suspension to the adaptors comprises raising a height of the vehicle.

* * * * *